United States Patent [19]
Watters et al.

[11] Patent Number: 5,363,801
[45] Date of Patent: Nov. 15, 1994

[54] ENCLOSURE SYSTEM FOR ANIMALS AND PLANTS

[75] Inventors: Jeffrey R. Watters, Rowlett; Anthony M. Thoes, Dallas, both of Tex.

[73] Assignee: Oceanic Systems, Inc., Dallas, Tex.

[21] Appl. No.: 107,209

[22] Filed: Aug. 16, 1993

[51] Int. Cl.⁵ .............................................. A01K 63/00
[52] U.S. Cl. .................................... 119/15; 119/265; 47/69
[58] Field of Search ............... 119/6.5, 15, 19, 246, 119/265, 266; 47/69

[56] References Cited

U.S. PATENT DOCUMENTS

| | | | |
|---|---|---|---|
| 3,721,212 | 3/1973 | Groth . | |
| 3,913,526 | 10/1975 | Hall . | |
| 4,029,048 | 6/1977 | Gershbein | 119/19 X |
| 4,291,494 | 9/1981 | Knablein | 47/69 X |
| 4,913,811 | 4/1990 | Chang et al. | 210/169 |
| 5,000,117 | 3/1991 | Gordon | 119/265 |
| 5,000,118 | 3/1991 | Merritt et al. . | |
| 5,009,190 | 4/1991 | Gordon | 119/15 X |
| 5,255,811 | 10/1993 | Simon | 119/265 |

FOREIGN PATENT DOCUMENTS 3907686 9/1989 Germany .................. 119/265

Primary Examiner—Robert P. Swiatek
Attorney, Agent, or Firm—Ross, Howison, Clapp & Korn

[57] ABSTRACT

An enclosure for animals and plants includes a bottom, first and second end walls, and first and second side walls. The walls and bottom are interconnected to form a unitary structure. A top for the structure extends between the walls. Structure is provided for selectively locking the top to the structure.

27 Claims, 2 Drawing Sheets

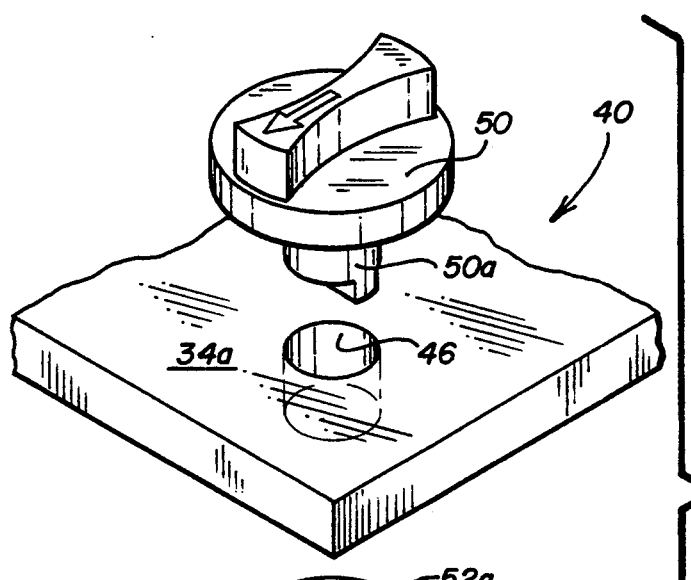
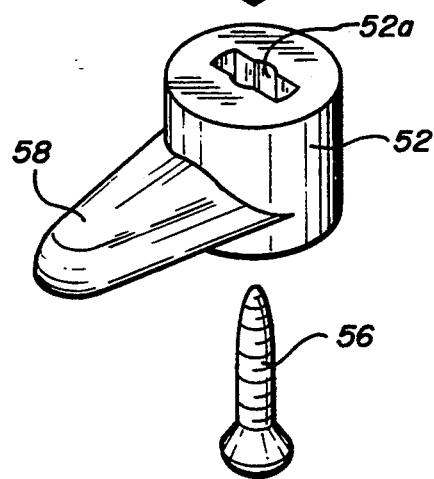
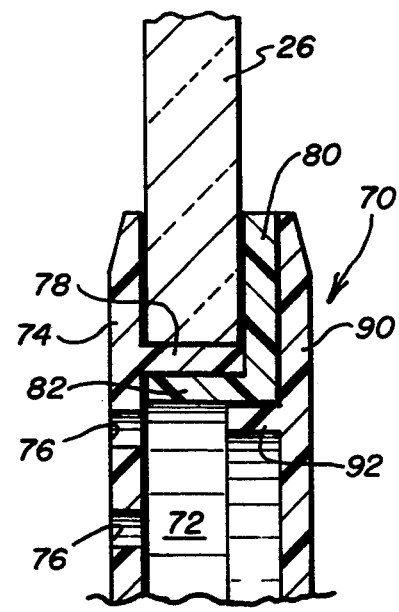
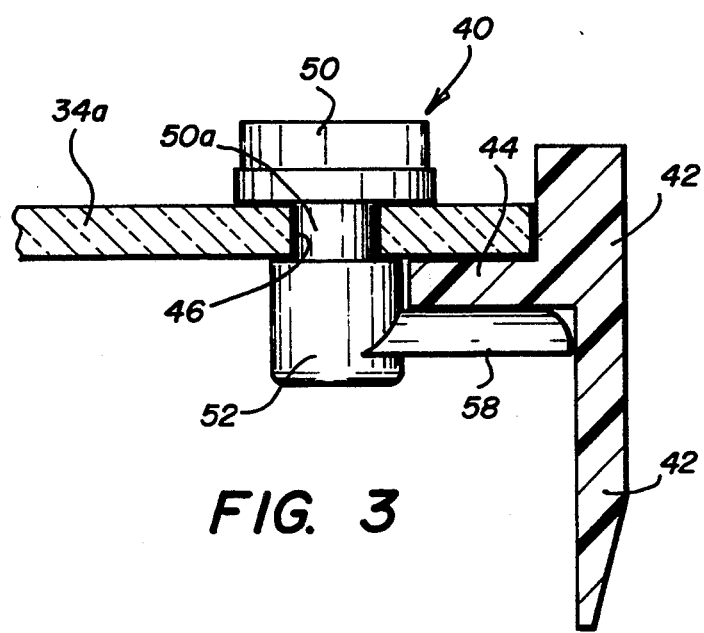
FIG. 2
FIG. 3
FIG. 5

ENCLOSURE SYSTEM FOR ANIMALS AND PLANTS

TECHNICAL FIELD OF THE INVENTION

The present invention relates to display enclosures, and more particularly to an enclosure for the display of animals, such as reptiles and amphibians, as well as plants.

BACKGROUND OF THE INVENTION

Enclosures, such as vivariums and terrariums for raising and observing animals and plants, present problems in creating a safe environment for animals and plants. Temperature and humidity needs of animals and plants must be addressed. Additionally, security measures must be built into such enclosures to prevent the escape of animals housed within such enclosures. Therefore, a need has arisen for an enclosure system for creating a safe environment and habitat for animals and plants.

SUMMARY OF THE INVENTION

In accordance with one aspect of the present invention, an enclosure for animals and plants is provided. The enclosure includes a bottom, first and second end walls, and first and second side walls. The walls and bottom are interconnected to form a unitary structure. A top for the structure is provided and extends between the walls. Structure is provided for selectively locking the top to the structure.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 2 is an exploded perspective view of the lock of the present invention for securing the enclosure top to the enclosure;

FIG. 3 is a sectional view taken generally along sectional line 3—3 of FIG. 1 illustrating the present lock engaged with the molding of the present enclosure;

FIG. 5 is a sectional view taken generally along sectional line 5—5 of FIG. 1 illustrating the assembled vent and cap of the present enclosure.

DESCRIPTION OF THE PREFERRED EMBODIMENTS

Figure 1:
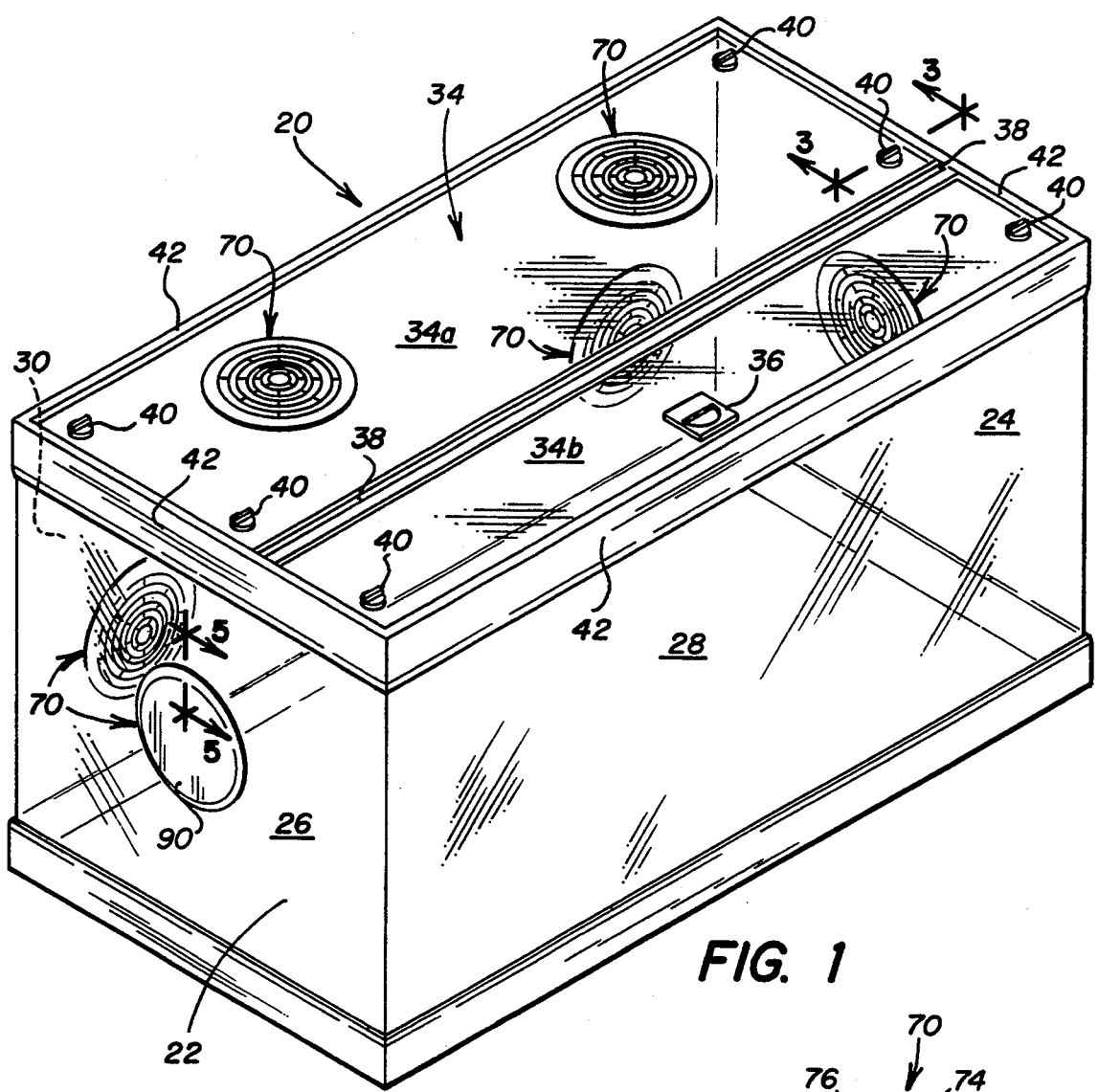
FIG. 1 is a perspective view of the present enclosure.

Referring to FIG. 1, the present enclosure is illustrated, and is generally identified by the numeral 20. Enclosure 20 may comprise, for example, a vivarium or a terrarium and functions as an enclosure for raising and observing animals or plants to provide a habitat for animals such as, for example, reptiles and amphibians as well as plants. Enclosure 20 includes a bottom 22, end walls 24 and 26, and side walls 28 and 30. An important aspect of enclosure 20 is a top 34. Top 34 is selectively removable and lockable to enclosure 20 to provide security for animals within enclosure 20. Top 34 includes a handle 36 for removal of top 34 from enclosure 20. Top 34 may include two portions 34a and 34b which are interconnected by a hinge 38 for gaining easy access to the interior of enclosure 20. Alternatively, top 34 may be a single portion.

Walls 24, 26, 28 and 30 may comprise, for example, transparent material such as glass or acrylic plastics. Top 34 may either be constructed of transparent or opaque material and may include, for example, glass or acrylic plastics. In order to diminish outside light and reflections from interfering with animals housed within enclosure 20, end walls 24 and 26 and one of side walls 28 and 30 may be tinted by using smoked glass, for example, to thereby provide a filter for light entering enclosure 20.

Referring simultaneously to FIGS. 1, 2, and 3, an important aspect of the present invention is the use of a locking system including locks 40 for securing top 34 to enclosure 20. Disposed around the top of walls 24, 26, 28 and 30 is a molding 42 having a step 44. Top 34 is disposed on step 44 around the perimeter of enclosure 20. Locks 40 are disposed at the corners of top 34 of enclosure 20 and adjacent to hinge 38 and extend through circular apertures 46 formed within top 34. Lock 40 includes a first member 50 which extends above top 34. First member 50 includes a pin 50a which engages a cam 52 having an aperture 52a and extends below top 34. Member 50 and cam 52 are interconnected utilizing a fastener 56 which passes through aperture 52a to engage pin 50a. Cam 52 includes a tab 58 which, through operation of member 50 is rotatable to engage the underside of step 44. With tab 58 engaging the underside of step 44, lock 40 is in the locked position to prevent removal of top 34 from enclosure 20. Lock 40 is operable by merely rotating member 50, 90 degrees such that tab 58 engages molding step 44.

Figure 4:
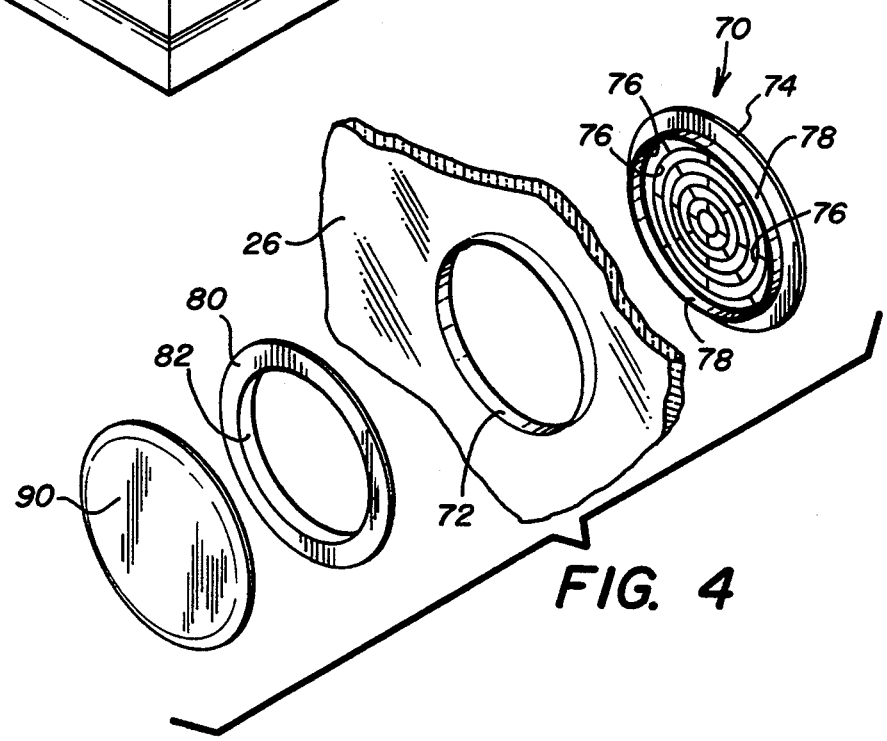
FIG. 4 is an exploded perspective view of the present vent and cap of the present enclosure ventilation system.

Referring now simultaneously to FIGS. 1, 4, and 5, an important aspect of the present invention is illustrated which includes a vent, generally identified by the numeral 70. Vent 70 may be disposed, for example, in end walls 24 and 26 and side walls 28 and 30 of enclosure 20, as well as in top 34. The specific number of vents 70 utilized with enclosure 20 will depend on the size of enclosure 20, and the amount of ventilation required within enclosure 20. Vents 70 provide ventilation from top 34, end walls 24 and 26, and side wall 30 to provide convection currents that ensure that waste gases do not collect at the bottom of enclosure 20 when used as a terrarium, and vents 70 are utilized to provide temperature, humidity, and ventilation controls for animals housed within enclosure 20 when used as a vivarium.

Vents 70 are formed within walls 24, 26, and 30, as well as top 34 through circular apertures 72. Vent 70 includes a cover 74 having a plurality of apertures 76 to provide maximum air flow through enclosure 20. Cover 74 includes flange 78 which frictionally engages apertures 72 of walls 24, 26, and 30 or top 34. Cover 74 is installed from the interior of enclosure 20 to thereby prevent animals housed within enclosure 20 from escaping by pushing cover 74 out of enclosure 20. Cover 74 is locked in place utilizing a ring 80 having a flange 82 which engages flange 78 of cover 74. Vent 70 further includes a cap 90 which includes a flange 92. Cap 90 can be interconnected to ring 80 such that flange 92 engages flange 82 of ring 80 to thereby completely close off apertures 76 of cover 74 to restrict the flow of air through vent 70. By selectively utilizing cap 90 on vents 70 disposed around enclosure 20, temperature and humidity can be controlled within enclosure 20.

It therefore can be seen that the present enclosure system provides for a environmentally safe and controllable environment for the raising and observing of animals or plants. The present enclosure system includes both a lockable top as well as a ventilation system which are both integrally part of the enclosure walls and top.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. An enclosure for animals and plants comprising:
   a bottom;
   a side wall;
   said side wall and said bottom being interconnected to form a unitary structure;
   a top for said structure;
   means for selectively locking said top to said structure
   a molding interconnected to said side wall adjacent said top, such that said locking means engages said molding;
   said top includes an aperture, said locking means being disposed within said aperture, such that a portion of said locking means extends above said top and a portion of said locking means extends below said top, said locking means portion extending below said top including means for engaging said molding to thereby lock said top to said structure; and
   said locking means is rotatable within said top aperture to selectively position said means for engaging said molding between an open position and a locked position.

2. The enclosure of claim 1 wherein said top comprises transparent material.

3. The enclosure of claim 1 wherein said top comprises opaque material.

4. The enclosure of claim 1 wherein said side wall includes means for filtering light entering said structure.

5. The enclosure of claim 1 wherein said side wall includes an aperture for providing an air flow passageway into and out of said structure.

6. The enclosure of claim 5 and further including:
   means disposed within said side wall aperture for controlling the passage of air through said wall aperture.

7. The enclosure of claim 5 wherein said side wall aperture is circular in shape.

8. The enclosure of claim 1 wherein said top includes an air flow aperture for providing an air flow passageway into and out of said structure.

9. The enclosure of claim 8 and further including means disposed within said air flow aperture for controlling the passage of air through said top aperture.

10. The enclosure of claim 8 wherein said air flow aperture is circular in shape.

11. An enclosure for animals and plants comprising:
    a bottom;
    first and second end walls;
    first and second side walls, said walls and said bottom being interconnected to form a unitary structure;
    a removable top for said structure, said top extending between said walls and including a plurality of apertures;
    a molding interconnected to said walls adjacent said top;
    locking means disposed within said top plurality of apertures for selectively engaging said molding to thereby lock said top to said structure;
    said locking means includes a portion extending above said top and said locking means includes a portion extending below said top, said portion extending below said top including means for engaging said molding upon rotation of said locking means portion extending above said top.

12. The enclosure of claim 11 wherein said top comprises transparent material.

13. The enclosure of claim 11 wherein said top comprises opaque material.

14. The enclosure of claim 11 wherein at least one of said walls includes an aperture for providing an air flow passageway into and out of said structure.

15. The enclosure of claim 14 and further including means disposed within said wall aperture for controlling the passage of air through said wall aperture.

16. The enclosure of claim 14 wherein said wall aperture is circular in shape.

17. An enclosure for animals and plants comprising:
    a bottom;
    a side wall, said side wall and bottom being interconnected to form a unitary structure;
    a removable top for said structure, said top including a plurality of apertures;
    a molding interconnected to said side wall adjacent said top;
    locking means disposed within said plurality of apertures for selectively engaging said molding to thereby lock said top to said structure, said locking means including a portion extending above said top and a portion extending below said top, said locking means portion extending below said top including means for engaging said molding upon rotation of said locking means portion extending above said top;
    said side wall including a circular aperture for providing an air flow passageway into and out of said structure; and
    said top further including a circular aperture for providing an air flow passageway into and out of said structure.

18. The enclosure of claim 17 and further including:
    means disposed within said side wall circular aperture for controlling the passage of air through said side wall circular aperture.

19. The enclosure of claim 18 wherein said control means includes a cap for closing said side wall circular aperture.

20. The enclosure of claim 17 and further including:
    means disposed within said top circular aperture for controlling the passage of air through said top circular aperture.

21. The enclosure of claim 20 wherein said control means includes a cap for closing said top circular aperture.

22. The enclosure of claim 17 wherein said top comprises transparent material.

23. The enclosure of claim 17 wherein said wall includes means for filtering light from entering said structure.

24. An enclosure for animals and plants comprising:
    a bottom;

a side wall, said side wall and bottom being interconnected to form a unitary structure;

a removable top for said structure;

said side wall including a circular aperture for providing an air flow passageway into and out of said structure;

said top including a circular aperture for providing an air flow passageway into and out of said structure;

means disposed within said side wall and top circular apertures for controlling the passage of air through said side wall and top circular apertures;

a molding interconnected to said side wall adjacent said top; and locking means disposed within said top for selectively engaging said molding to thereby lock said top to said structure, said locking means including a portion extending above said top and a portion extending below said top, said portion extending below said top including means for engaging said molding upon rotation of said locking means portion extending above said top.

25. The enclosure of claim 24 wherein said control means includes a cap for closing said side wall and top circular apertures.

26. The enclosure of claim 24 wherein said top comprises transparent material.

27. The enclosure of claim 24 wherein said side wall includes filter means for restricting passage of light into said structure.

* * * * *